April 21, 1925.  1,534,971
T. W. LEE
MACHINE FOR ROUNDING GEAR TEETH
Filed March 27, 1922     4 Sheets-Sheet 1
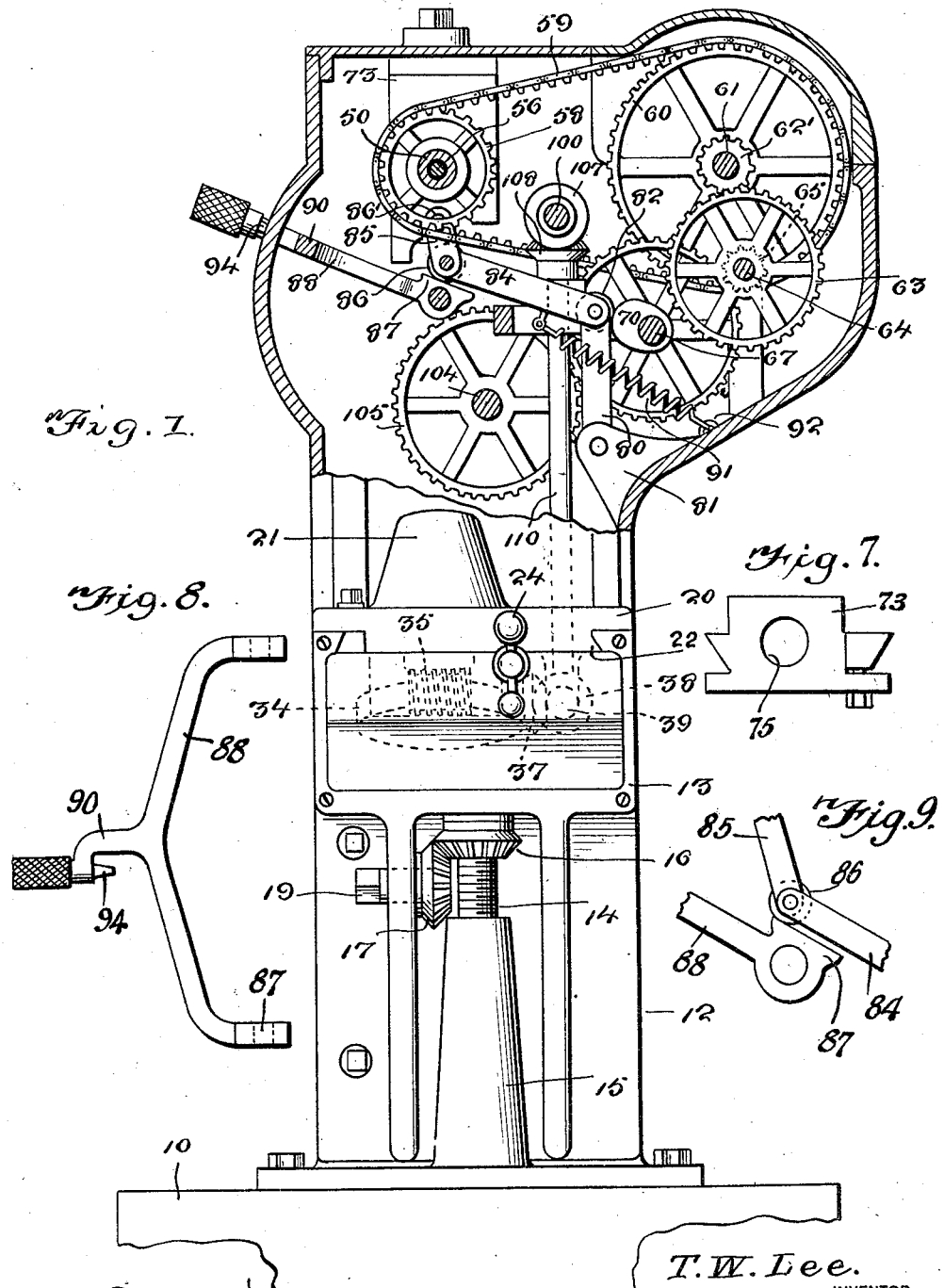
T. W. Lee.
INVENTOR April 21, 1925.
T. W. LEE
1,534,971
MACHINE FOR ROUNDING GEAR TEETH
Filed March 27, 1922 4 Sheets-Sheet 2
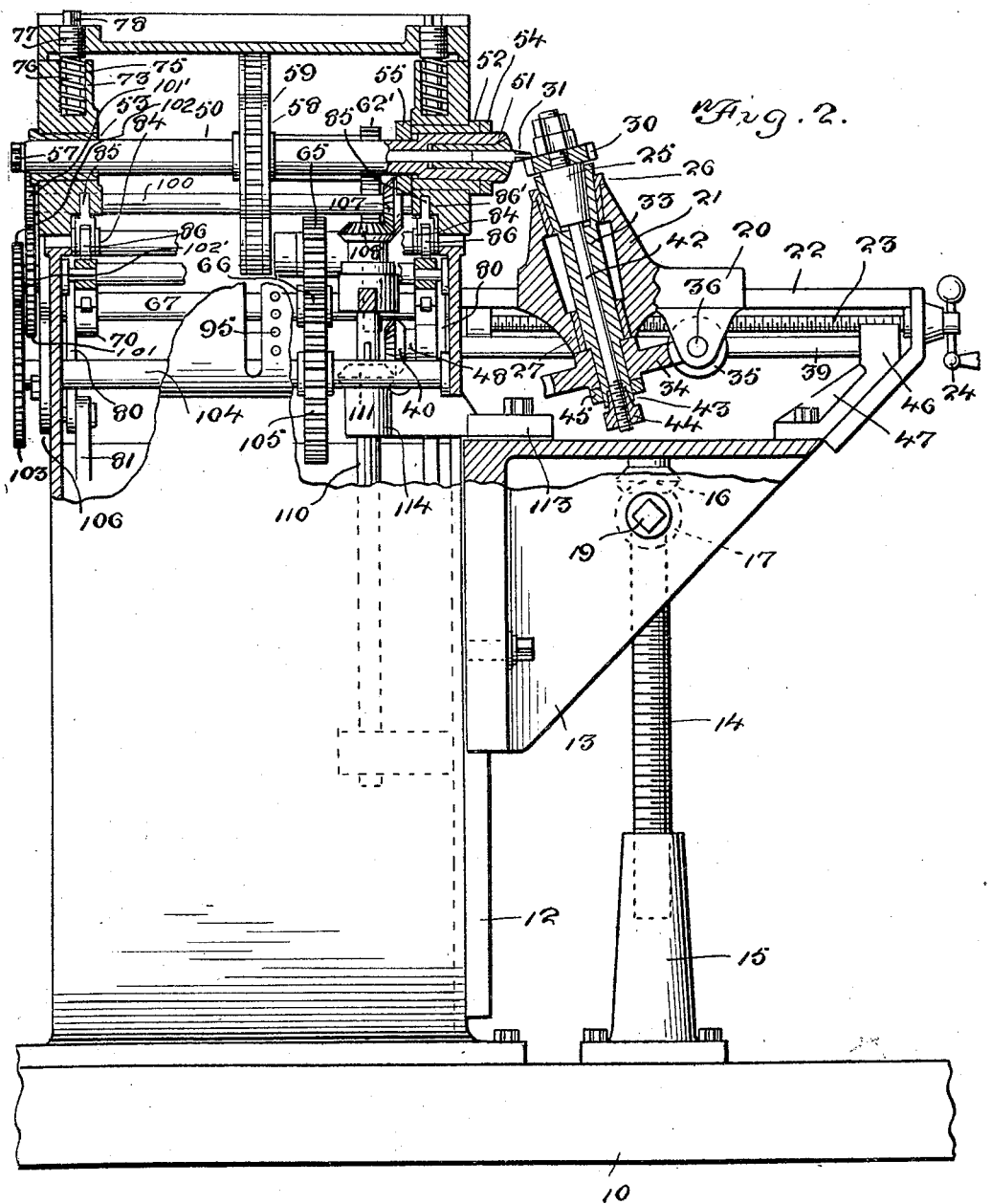

April 21, 1925.  1,534,971
T. W. LEE
MACHINE FOR ROUNDING GEAR TEETH
Filed March 27, 1922  4 Sheets-Sheet 3
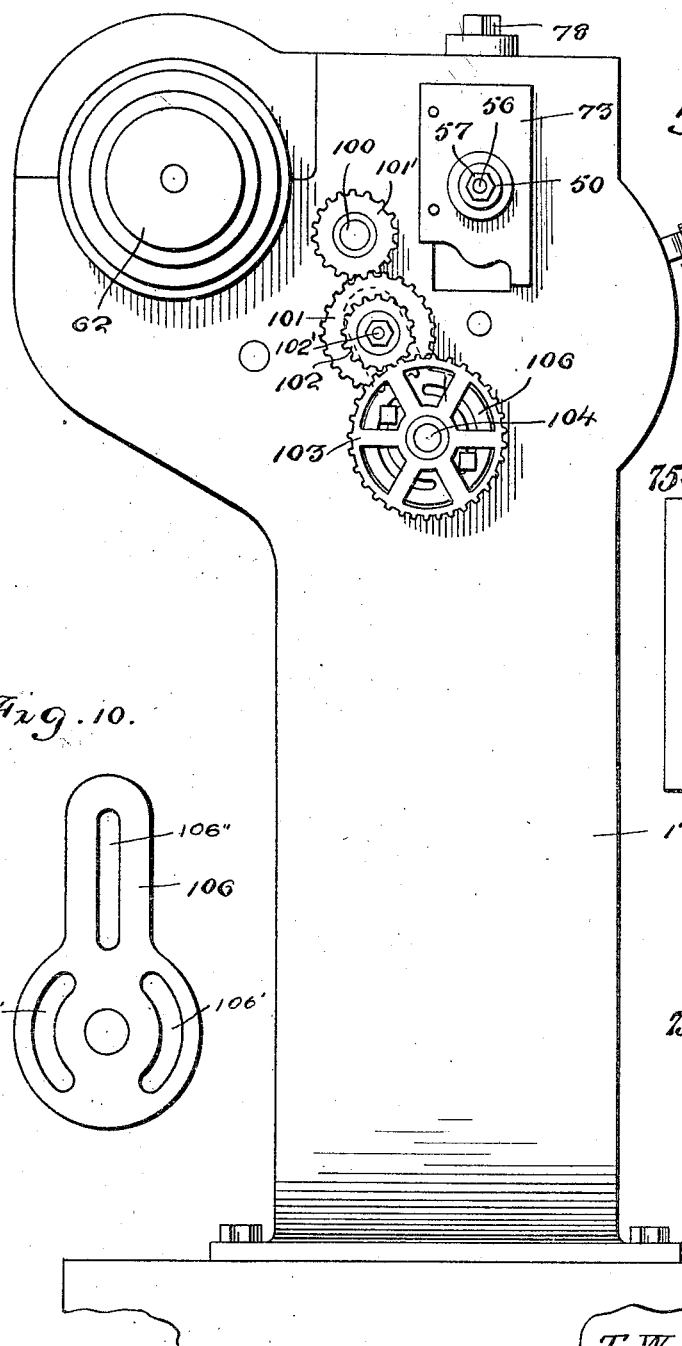
T. W. Lee.
INVENTOR
BY Victor J. Evans
ATTORNEY

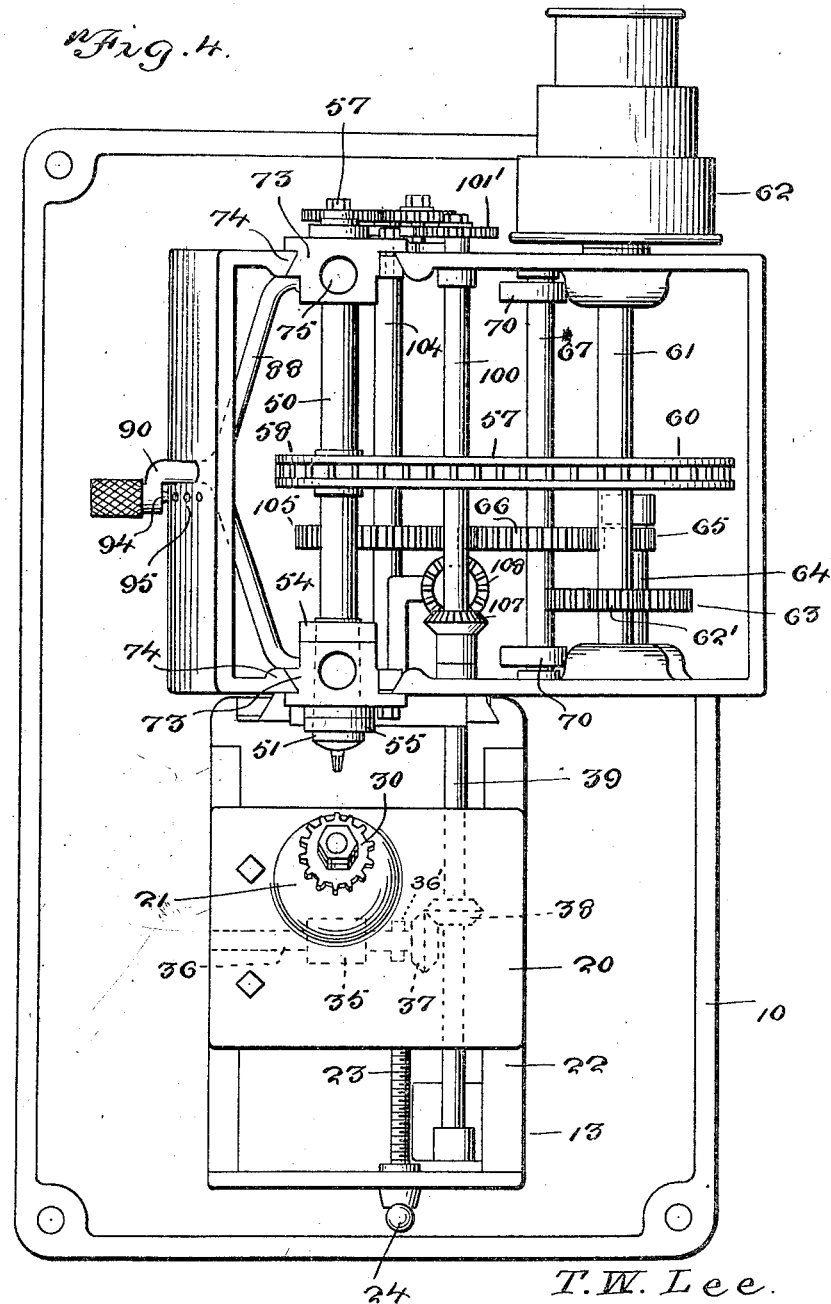

Patented Apr. 21, 1925.

1,534,971

UNITED STATES PATENT OFFICE.

THOMAS WILLIAM LEE, OF BATAVIA, OHIO.

MACHINE FOR ROUNDING GEAR TEETH.

Application filed March 27, 1922. Serial No. 547,070.

*To all whom it may concern:*

Be it known that I, THOMAS WILLIAM LEE, a citizen of the United States, residing at Batavia, in the county of Clermont and State of Ohio, have invented new and useful Improvements in Machines for Rounding Gear Teeth, of which the following is a specification.

This invention relates to a machine for rounding the teeth of gear wheels, and the object is to provide gear mounting means and means for moving a horizontal spindle carrying a cutting element, in a vertical direction, and in timed relation with the rotation of the arbor.

A further object is to provide for the mounting of the arbor at an incline with reference to the horizontally and vertically movable spindle.

A further object is to provide a particular drive for the spindle mounting the cutting element, and a particular drive for the arbor mounting the gear wheel.

A further object is to provide for the vertical movement of the cutting element, in a direction perpendicular to its axis, by cam mechanism and devices actuated thereby which will permit of imparting a throw to the mounting means of the cutting element.

A further object is to provide controlling means for governing the extent of throw of the cam controlled devices.

A still further object is to provide a plurality of pivotally connected elements controlled by the cam mechanism and acting to directly reciprocate vertically movable slides or boxes mounting the horizontal spindle, and a device which may be inclined at different angles and which is engaged by the cam controlled elements for imparting that degree of throw to the slides or boxes required under varying conditions.

With the foregoing and other objects in view, the invention consists in the novel construction and arrangement of elements described and claimed, it being understood that modifications may be made within the scope of the claims without departing from the spirit of the invention.

In the accompanying drawing:

Figure 1 is a view of the machine in vertical section and elevation.

Figure 2 is a view in vertical section and elevation, from another angle.

Figure 3 is a view in elevation, looking from the left in Figure 2.

Figure 4 is a top plan view.

Figure 5 shows one of the bearing members for the horizontal spindle carrying the cutting tool.

Figure 6 is a section on line 6—6 of Figure 5.

Figure 7 is a top plan view of the device appearing in Figure 5.

Figure 8 shows a forked lever, in top plan, this lever also appearing in the upper left hand portion of Figure 1.

Figure 9 is a detail view showing the manner in which the inclined portions of the lever of Figure 8 control the movement of the devices of Figure 1 operated by the cam.

Figure 10 is an elevation of a change gear quadrant, to be used in the drive for the arbor mounting the gear wheel being operated upon.

In connection with Figures 1 and 2, it may be stated that the arbor mounting the gear wheel to be operated upon, is itself mounted at an angle of about twelve degrees with reference to the vertical, and the cam mechanism and associated devices of Figure 2 impart a vertical movement to the mounting means of the tool spindle, in such timed relation that during each revolution of the cam the tool travels from the base of a given tooth, over the top thereof, to the base or root of the next tooth, for producing the rounded end, the arbor mounting the gear wheel being shaped, serving to rotate this gear wheel a distance of one tooth.

Mounted on the base 10 is a main frame 12, and slidable vertically with reference to this frame is a knee 13, the elevation of which is controlled by screw 14 operating in a threaded element or pedestal 15 carried by the base 10. Adjustment is effected through the gear wheels 16 and 17, the latter being mounted on a stub shaft 18 having an annular end portion 19.

An arbor mounting device 20 includes an upward extension 21, the device 20 being movable horizontally in slides 22 in the knee. The horizontal movement of element 20 is effected by means of screw 23 controlled by a ball crank 24. This screw engages a threaded portion of the element 20, providing the movement specified.

A tapered arbor 25 is mounted in the upper and lower bearings 26 and 27 and serves to mount a gear wheel 30, the teeth of which are to be rounded. The cutter is shown at 31, and has the particular movement heretofore indicated, and referred to more specifically below. The tubular element 33 of the arbor mounts a worm wheel 34 meshing with the worm 35. The worm is mounted on shaft 36 carrying a gear wheel 37 meshing with gear wheel 38 on shaft 39, this shaft extending into the housing of the machine and having keyed thereon a beveled gear wheel 40.

In connection with the construction of the arbor, it should be stated that a draw bolt 42 extends through the tubular element 33, the lower end of the bolt being threaded and engaged by the threaded tapered portion 43 of adjusting nut 44. A locking collar for the worm gear wheel is shown at 45. Elements 33 and 25 rotate together and provide for the continuous rotation of the gear wheel 30. Shaft 39 is mounted at one end in bearing 46 of bracket 47, and at the other end in bearing 48.

The spindle 50 carries the draw-in collet 51 for the cutting tool, a front bearing being shown at 52, and a rear bearing element at 53. Thrust collars 54 and 55 serve an obvious purpose. The bolt or rod 56 for the collet is provided at the rear end with an adjusting nut 57.

The spindle 50 carries a sprocket wheel 58 driven by chain 59 from sprocket wheel 60 on the main driving shaft 61 carrying a stepped pulley 62. Shaft 61 also carries a pinion 62' meshing with a gear wheel 63 on shaft 64, and pinion 65 rigid with reference to the shaft last named, meshes with gear wheel 66. This gear wheel last named is keyed on shaft 67, this shaft also mounting a cam 70 actuating mechanism described below for imparting vertical movement to the mounting means of spindle 50. Figures 5, 6 and 7 show the slides or boxes 73 which have dovetail slidable connection with the guides 74 shown in Figure 4. Each element 73 is provided with a vertical bore 75 receiving a spring encircled pin 76 provided with a threaded portion 77 and an angular portion 78, for adjustment. The spring 79 enters the bore of member 73, and the latter is, in fact, the element which is resiliently held.

A rocking arm 80 is pivoted on bracket 81, and carries a roller 82 with which the cam 70 cooperates Pivoted to the upper end of arm 80 is a bar 84 pivoted to link 85 and carrying a roller 86 cooperating with one of the inclined surfaces 87 on portion 88 of a forked lever 90. Link 85 is connected at 86' with element 73 and imparts vertical movement thereto. The construction just described being duplicated near the opposite end of the spindle 50, the slidable member 73 at that point will be similarly controlled, and the vertical movement desired will be imparted to the spindle by the action of the cam 70, the rollers engaged thereby, and the elements actuated by rocking arms 80. A spring 91 is connected with rod 84 at the point shown, and its opposite end is connected with a stationary member at 92.

The lever 90 mounts a spring held pin 94, for holding the lever in an adjusted position, by engagement with one of the recesses 95. The adjustment of the lever 90 varies the angle of the inclined portions 87, the result being that the throw imparted by the cam 70 produces a greater or less vertical movement of the boxes 73, and therefore of the spindle 50 and the tool 31 which operates directly on the gear teeth, the ends of which are to be rounded. The tool moves upward in a vertical path under positive thrust, and downwardly by gravity, along the inclined portions 87,—spring 91 aiding this movement in some degree.

Transverse shaft 100 carries a gear wheel 101' on the rear end, this wheel being driven by wheels 101, 102, 103, the latter being carried by the shaft 104 mounting gear wheel 105 driven by gear wheel 66, before referred to. A change gear quadrant is designated 106. This quadrant may be bolted to frame 12 at different angles, by bolts passing through curved slots 106', the long slot 106" permitting variable mounting of stud 102' on which gear wheels 101, 102 (rigidly connected), are rotatable. Wheel 101 meshes with wheel 101', but a wheel of different diameter may be substituted for wheel 102, and the variable mounting of the short shaft or stud of this wheel, in slot 106", will still permit a wheel such as 101 to mesh with wheel 101'. Shaft 100 carries a bevelled gear wheel 107 meshing with bevelled gear wheel 108 on vertical shaft 110, and the latter has splined thereon a bevelled gear wheel 111 meshing with bevelled gear wheel 40 for rotating the horizontal shaft 39 and the worm gearing driving the arbor which mounts the gear wheel being operated upon.

Bracket 113 on the knee 13 provides a bearing element 114, and the slidable mounting of gear wheel 111 on this shaft 110 permits of the vertical movement of the shaft 39 in a slot provided in the wall of the housing. The inner bearing of shaft 39 is also carried by bracket 113, or forms a part thereof.

Having thus described the invention, I claim:

1. In a machine of the class described, a continuously rotating arbor for mounting a gear wheel, a shaping tool, means for mounting and rotating the tool, and means for imparting movement to the tool in a direction perpendicular to its main axis and permitting return movement by gravity.

2. In a machine of the class described, a continuously rotating arbor for mounting a gear wheel, a shaping tool, means for mounting and rotating the tool, and means for imparting movement to the tool in a direction perpendicular to its main axis and permitting return movement by gravity, said arbor being inclined with reference to the main axis of the tool.

3. In a machine of the class described, an arbor for mounting a gear wheel, a shaping tool, means for mounting and rotating the tool, means for imparting movement to the tool in a direction perpendicular to its main axis and permitting return movement by gravity, and means for continuously rotating the arbor in timed relation to the perpendicular movement of the tool.

4. In a machine of the class described, an arbor for mounting a gear wheel, a shaping tool, means for mounting and rotating the tool, means for imparting movement to the tool in a direction perpendicular to its main axis, and means including an adjustable yoke formed and mounted to present inclined surfaces, for varying the extent of perpendicular movement.

5. In a machine of the class described, an arbor for mounting a gear wheel, a shaping tool, means for mounting and rotating the tool, means for imparting movement to the tool in a direction perpendicular to its main axis, said means last named including a lever having inclined bearing surfaces.

6. In a machine of the class described, an arbor for mounting a gear wheel, a shaping tool, means for mounting and rotating the tool, means for imparting movement to the tool in a direction perpendicular to its main axis, said means last named including cam mechanism, an inclined plane and an element oscillating thereon.

7. In a machine of the class described, an arbor for mounting a gear wheel, a shaping tool, means for mounting and rotating the tool, means for imparting movement to the tool in a direction perpendicular to its main axis, said means last named including cam mechanism and devices controlled thereby and adjustable to vary the extent of perpendicular movement, one of these devices having an inclined surface and another of said devices oscillating with reference thereto.

8. In a device of the class described, an arbor for mounting a gear wheel, a tool movable over the ends of the teeth of the gear wheel for rounding said ends, and means for rotating the gear wheel and tool about axes inclined with reference to each other, and means including a plurality of inclined planes simultaneously adjustable, for elevating and lowering the arbor with reference to the tool.

9. In a device of the class described, an arbor for mounting a gear wheel, a tool movable over the ends of the teeth of the gear wheel for rounding said ends, means for rotating the gear wheel and tool continuously and in timed relation about axes inclined with reference to each other, and a vertically adjustable knee for elevating the arbor with reference to the tool.

10. In a machine of the class described, means for rotatably mounting a gear wheel, a continuous drive for said means, a cutting tool for shaping the ends of the teeth of said wheel, means for driving the cutting tool in timed relation to the drive first named, and means for imparting movement to the cutting tool perpendicularly of its axis, said means last named including a cam, devices presenting spaced slidable inclined members, devices operated thereby, tool mounting means, and connections between the tool mounting means and the cam operated devices.

11. In a machine of the class described, means for rotatably mounting a gear wheel, a cutting tool and a spindle therefor, means for rotating the spindle, vertically movable boxes for mounting the spindle, and means imparting movement to the boxes for causing the tool to pass around the end of one tooth of the gear wheel during the interval required for rotating said gear wheel through an angle equal to the distance between successive teeth.

12. In a machine of the class described, means for rotatably mounting a gear wheel, a cutting tool, means for rotating the tool, and means for elevating the tool in a vertical path to cause it to pass around the end of one tooth of the gear wheel and permit return movement by gravity during the interval required for continuously rotating said gear wheel through an angle equal to the distance between successive teeth.

13. In a machine of the class described, a vertically adjustable arbor for rotatably mounting a gear wheel, a cutting tool, means for rotating the tool, and means for elevating the tool in a vertical path to cause it to pass around the end of one tooth of the gear wheel and permit return movement by gravity during the interval required for continuously rotating said gear wheel through an angle equal to the distance between successive teeth.

14. In a machine of the class described, an inclined and vertically adjustable arbor for rotatably mounting a gear wheel, a cutting tool, means for rotating the tool, and means for elevating the tool in a vertical path to cause it to pass around the end of one tooth of the gear wheel and permit return movement by gravity during the interval required for continuously rotating said gear wheel through an angle equal to the distance between successive teeth.

15. In a machine of the class described, a main frame, a knee vertically adjustable thereon, an arbor, an arbor mounting device, and means for moving the latter horizontally, means for continuously driving the arbor and a rotatable spindle journaled in the main frame for holding a tool in position to engage the work held by the arbor.

16. In a machine of the class described, a main frame, a knee vertically adjustable thereon, an arbor, an arbor mounting device, means for moving the latter horizontally, a rotatable spindle journaled in the main frame for holding a tool in position to engage the work held by the arbor, and driving means for imparting continuous-rotary movement to the arbor and to the spindle, said driving means permitting to the adjustment of the knee without discontinuing the drive.

17. In a machine of the class described, a main frame, a knee mounted thereon, an arbor, a slidable device for mounting the arbor at an angle with reference to the vertical, manual means for controlling the slidable device, power operated means for continuously rotating the arbor, and a rotatable device for mounting a cutting element.

18. In a machine of the class described, a main frame, a vertically adjustable element carried thereby, an element slidable horizontally on the vertically adjustable element, and having a bore inclined at an angle with reference to the vertical, a tapered arbor mounted in the bore, means for adjusting the arbor, and means for rotating said arbor.

19. In a machine of the class described, means for mounting the work, means for mounting a rotating cutting element in position to act on the work, and mechanism for imparting movement to the cutting element in a direction perpendicular to its main axis, said mechanism including spindle mounting means, a cam, a rocking arm engaged by the cam, a device controlled by the rocking arm, and means controlling the extent of upward movement to said device by the arm when the latter is engaged by the cam.

20. In a machine of the class described, means for mounting the work, means for mounting a rotating cutting element in position to act on the work, and mechanism for imparting movement to the cutting element in a direction perpendicular to its main axis, said mechanism including a spindle mounting means, a cam, a rocking arm engaged by the cam, a device controlled by the rocking arm, and means controlling the extent of upward movement to said device by the arm when the latter is engaged by the cam, said means last named including a pivoted member having surfaces assuming different angles of inclination upon the movement of the pivoted element on its axis.

21. In a machine of the class described, a rotatable work supporting device, a horizontal rotatable tool mounting spindle, driving means for said device, means for imparting upward movement to the spindle, and means for mounting the driving means of the work supporting device, said mounting means including a change gear quadrant.

22. In a machine of the class described, a rotatable work supporting device, a horizontal rotatable tool mounting spindle, driving means for said device and spindle, means for imparting upward movement to the spindle, means imparting rotation to the spindle at constant speed, and means for mounting the driving means of the work supporting device, said mounting means including a change gear quadrant.

In testimony whereof I affix my signature.

THOMAS WILLIAM LEE.